Feb. 19, 1935.　　　L. D. HOULIS　　　1,991,613
TRAY TYPE BAKER'S OVEN
Filed April 12, 1933

Louis D. Houlis
INVENTOR

Patented Feb. 19, 1935

1,991,613

UNITED STATES PATENT OFFICE 1,991,613

TRAY TYPE BAKER'S OVEN

Louis D. Houlis, Seattle, Wash.

Application April 12, 1933, Serial No. 665,748

3 Claims. (Cl. 116—129)

This invention relates to a new and useful improvement in bakers' tray type ovens, and particularly those ovens which employ a carrier on which numerous trays are mounted and revolve or travel within the baking chamber.

One object of the invention is to provide a means on such tray type oven by which the baker can tell without opening the door of the baking chamber which one of the trays is in line with the door and in position for loading or unloading.

A particular object of the invention is to provide an oven having a baking chamber, in this chamber is enclosed a reel carrying a plurality of trays, which reel is mounted on the shaft, the shaft projecting through the end wall of the oven and having an indicating dial mounted at its end, which dial has numbers or markers, one for each shelf within the baking chamber, and an arrow or indicator, so placed pointing to the dial as to indicate a number on the dial when a shelf is in line with the oven door in loading or unloading position.

Another object of the invention is to provide a means in the form of an indicating device which can be applied to any tray type revolving oven or tray type traveling oven as to indicate the exact position of the trays within the baking chamber in relation to the loading door of the oven, and so arranged that a baker standing at different angles from the device can easily read the indicating dial and the number or marker on same and judge the position of the trays in the chamber without opening the door of the oven.

A construction designed to carry out the invention will be hereinafter described, together with other features of the invention. The invention will be more readily understood by the reading of the following specification and by reference to the accompanying drawing in which an example of the invention is shown, and wherein.

Figure 1:
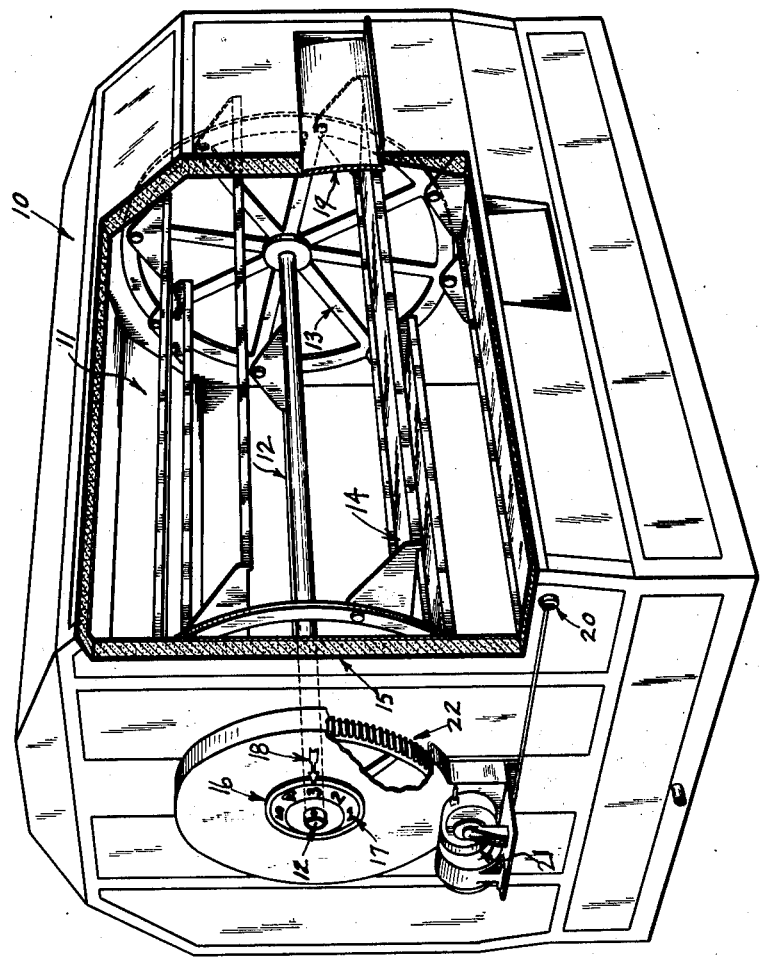
Figure 1 is a perspective view showing the device in position at the end of a shaft on a revolving oven.
Figure 2:
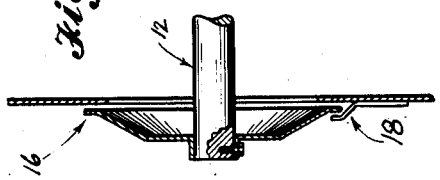
Figure 2 shows a cross section of one form of such a device in accordance with the invention.

In the drawing the numeral 10 designates a tray revolving oven consisting of a baking chamber 11 through this chamber is rotating a reel having a shaft 12 on which are mounted spider wheels 13 which carry trays 14. The end of the shaft 12 projects through the oven end wall 15 and on its end is mounted an indicating dial 16 which has numbers or markers 17 one for every shelf in the baking chamber. An arrow pointer 18 pointing to the dial 16 indicates the position of the trays in relation to the loading oven chamber door 19.

In the drawing I have shown an electric switch 20 which supplies current for the motor and driving mechanism 21 which engages a gear 22 and drives the shaft 12 which in turn rotates the reel inside the oven chamber.

When the door 19 is closed and the reel inside the oven is in motion the indicating dial 16 gives the exact location of the trays in the chamber without opening the oven door.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A baking oven, a baking chamber, having a loading door, a reel having trays and mounted on the shaft rotating within the chamber, and a dial mounted on the end of the shaft outside the chamber and an arrow located adjacent to the dial indicating the position of the trays in relation to the loading door of the oven.

2. A baking oven comprising, a baking chamber and door, a baking support having trays rotated by a shaft within the baking chamber, and a numbered dial rotated by the shaft, and an arrow positioned with respect to the rotating shaft and dial to indicate the position of the trays in the chamber.

3. A baking oven, a baking chamber, a shaft through the baking chamber, a carrier mounted on the shaft in the baking chamber, and a bevel ring shaped dial mounted on the end of the shaft on the outside of the chamber, and an arrow pointing to the dial to indicate the position of the trays in relation to the loading door of the chamber.

LOUIS D. HOULIS.